United States Patent [19]
Monserud et al.

[11] Patent Number: 5,418,824
[45] Date of Patent: May 23, 1995

[54] IN SITU INLET MIXER CLEANING SYSTEM

[75] Inventors: David O. Monserud, Seattle; David H. Bothell, Puyallup; Paul H. Tacheron, Kent; Michael C. McDonald, Sumner; David E. Steele, Seattle, all of Wash.; James E. Charnley, Nevada City; Gunnar V. Vatvedt, Los Gatos, both of Calif.

[73] Assignee: General Electric Company, San Jose, Calif.

[21] Appl. No.: 63,596

[22] Filed: May 19, 1993

[51] Int. Cl.[6] .................. G21C 19/00; B08B 3/00
[52] U.S. Cl. .................. 376/316; 134/167 C; 134/169 C
[58] Field of Search .............. 376/316, 260; 134/167 C, 169 C, 172, 198, 22.12

[56] References Cited
U.S. PATENT DOCUMENTS

| | | | |
|---|---|---|---|
| 5,052,624 | 10/1991 | Boers et al. | 239/525 |
| 5,065,789 | 11/1991 | Eslinger | 137/513.5 |
| 5,125,425 | 6/1992 | Folts et al. | 134/167 C |
| 5,264,042 | 11/1993 | Wells et al. | 134/167 C |

*Primary Examiner*—Daniel D. Wasil
*Attorney, Agent, or Firm*—J. E. McGinness

[57] ABSTRACT

An apparatus for cleaning inlet mixers while they remain in their operating position within a nuclear reactor. A cleaning tool is inserted by remote control into the inlet mixer via a secondary inlet opening. Following insertion of the cleaning tool, the internal surfaces of the inlet mixer are cleaned with a waterjet created from an ultra-high-pressure source and directed by controlled positioning of a cleaning head having a nozzle which scans the cleaning waterjet across the surface to be cleaned. The cleaning system includes a nozzle cleaning tool, a throat/barrel/flare cleaning tool, pumping systems for supplying ultra-high-pressure equal to at least 20,000 psi and low-pressure water to an installed cleaning tool, a launching system located at the top of the opened reactor vessel for feeding the water conduits (power), control cables, monitoring cables (instrument) and cleaning tool into and out of the inlet mixer, and a computerized process monitoring and control system.

14 Claims, 15 Drawing Sheets

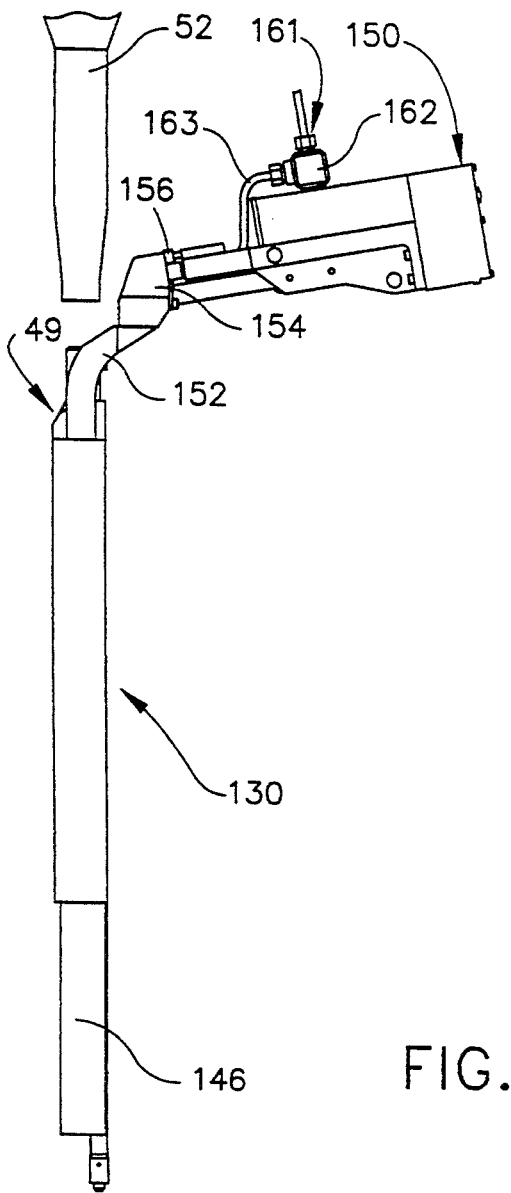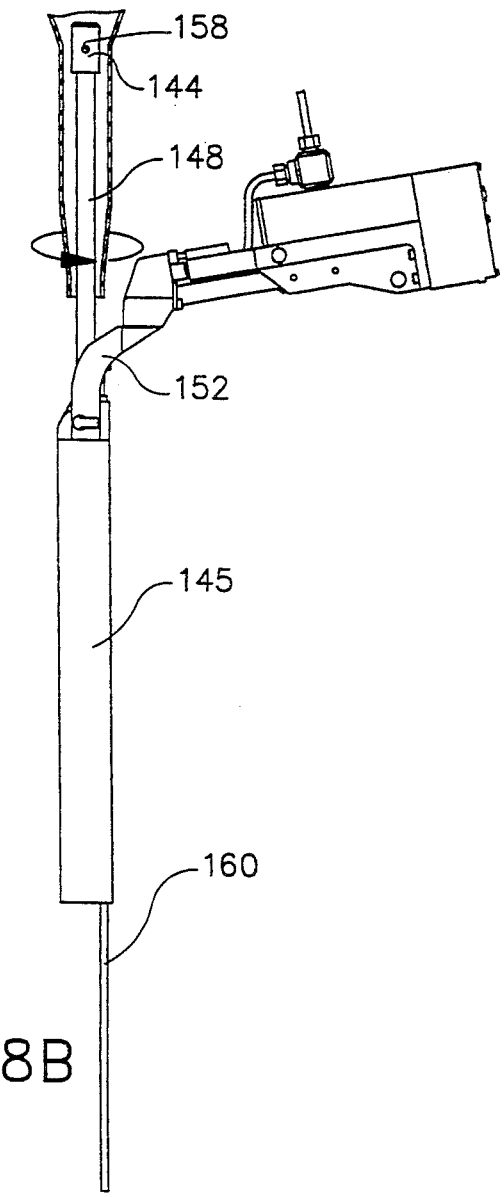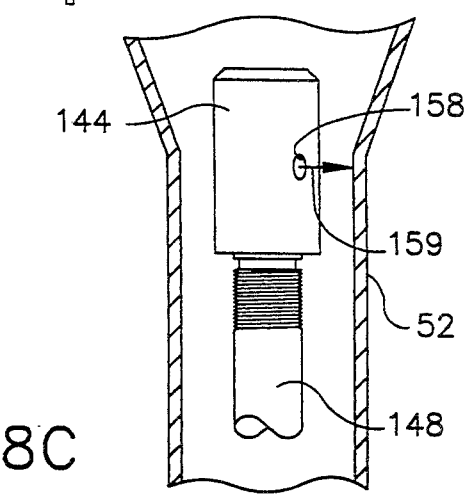
FIG. 8A
FIG. 8B
FIG. 8C

5,418,824

IN SITU INLET MIXER CLEANING SYSTEM

FIELD OF THE INVENTION

This invention generally relates to the cleaning of components in a boiling water reactor ("BWR"). In particular, the invention concerns the removal of scale buildup from the inlet mixers of a BWR.

BACKGROUND OF THE INVENTION

In a conventional BWR (see FIG. 1), the core of nuclear fuel is cooled by water. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20 comprising numerous fuel assemblies 22 (only two 2×2 arrays of which are depicted in FIG. 1). Each fuel assembly is supported at the top by top guide 19 and at the bottom by core plate 21. Water flowing through down-comer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has to 24 inlet mixers.

The structure of a typical BWR inlet mixer 46 is shown in detail in FIGS. 2A and 2B. In flow sequence starting from the outlet of elbow 48, the inlet mixer comprises: a pre-nozzle section 50; a nozzle section including five nozzles 52 circumferentially distributed at equal angles about the inlet mixer axis; a throat section 54; a barrel section 56; a flare section 58; and a slip joint 60. Each nozzle is tapered at its outlet, so that the nozzle has a maximum diameter $d_1$ and an exit diameter $d_2$ which is less than $d_1$ (see FIG. 2B).

Five secondary inlet openings 62 are circumferentially distributed at equal intervals about the inlet mixer axis. These secondary inlet openings are situated radially outside of the nozzle exits. Therefore, as jets of water exit the nozzles 52, water from the downcomer annulus 16 is drawn into the inlet mixer via the secondary inlet openings, where it is mixed with water from the recirculation pump (not shown).

Experience has shown that during reactor operation, scale forms on critical surfaces of the inlet mixers, including all surfaces from the end of slip joint 60 through 8 inches of the nozzle section. This scale buildup is a significant problem because it causes a loss of cooling flow and reduces reactor output, which is very costly to utilities using nuclear power.

The annular volume between the core shroud 16 and the reactor pressure vessel 10, in which the inlet mixers are located, is difficult to access. Also the complex surfaces and radioactivity of the inlet mixers make mechanical cleaning nearly impossible. At this time, a chemical cleaning method has not been designed for this problem. In addition, the chemicals themselves present disposal problems to the extent that they are not allowed at many reactor sites. Currently, the only method available to eliminate scale buildup is to replace the inlet mixers with new units. However, replacing the inlet mixers is expensive and time consuming for the following reasons: (1) building new inlet mixers could take more than one year; (2) the reactor would have to be shutdown for a long period of time during installation of the inlet mixers; and (3) disposal of the old inlet mixers requires special handling and storage procedures because they are radioactive.

SUMMARY OF THE INVENTION

The present invention solves the foregoing problem by providing an apparatus for cleaning inlet mixers while they remain in their operating position within the reactor ("in situ cleaning"). In accordance with the preferred embodiments of the invention, a water-powered cleaning tool is inserted by remote control into the inlet mixer via a secondary inlet opening. Following insertion of the cleaning tool, the internal surfaces of the inlet mixer are cleaned with a waterjet created from an ultra-high-pressure source and directed by controlled positioning of a cleaning head having a waterjet nozzle. The term "ultra-high pressure" ("UHP") as used herein means pressures equal to at least 20,000 psi.

The cleaning system in accordance with the invention comprises the following components: a nozzle cleaning tool and a throat/barrel/flare ("TBF") cleaning tool which can be interchangeably installed to perform two different cleaning operations; a set of interchangeable fixtures for guiding the cleaning tools into the correct position and orientation for insertion in the inlet mixer; a clamping fixture for supporting each of the interchangeable fixtures on the inlet mixer; a locating fixture for placing the clamping fixture at the correct azimuthal and axial positions; pumping systems for supplying UHP and low-pressure water to an installed cleaning tool; a launching system located at the top of the opened reactor vessel for feeding the water conduits (power), control cables, monitoring cables (instrument) and cleaning tool into and out of the inlet mixer; and a computerized process monitoring and control system for controlling and monitoring the cleaning process.

The UHP water is used in waterjet cleaning to remove scale build-up on inner surfaces of the inlet mixer. The UHP water is supplied via a conduit to a cleaning head having a waterjet nozzle which scans the surface to be cleaned. The impact of the UHP waterjet removes scale from the internal surfaces on which the waterjet impinges. The nozzle cleaning tool is used to clean the internal surfaces of the inlet mixer nozzles. The TBF cleaning tool is used to clean the internal surfaces of the throat, barrel and flare sections of the inlet mixer.

BRIEF DESCRIPTION OF THE DRAWINGS

FIGS. 8A and 8B are side views showing the nozzle cleaning tool of FIG. 7 (in retracted and extended positions, respectively) in relation to an inlet mixer nozzle to be cleaned.

FIG. 8C is a magnified view of the cleaning head shown in FIG. 8B.

DETAILED DESCRIPTION OF THE PREFERRED EMBODIMENTS

Figure 3:
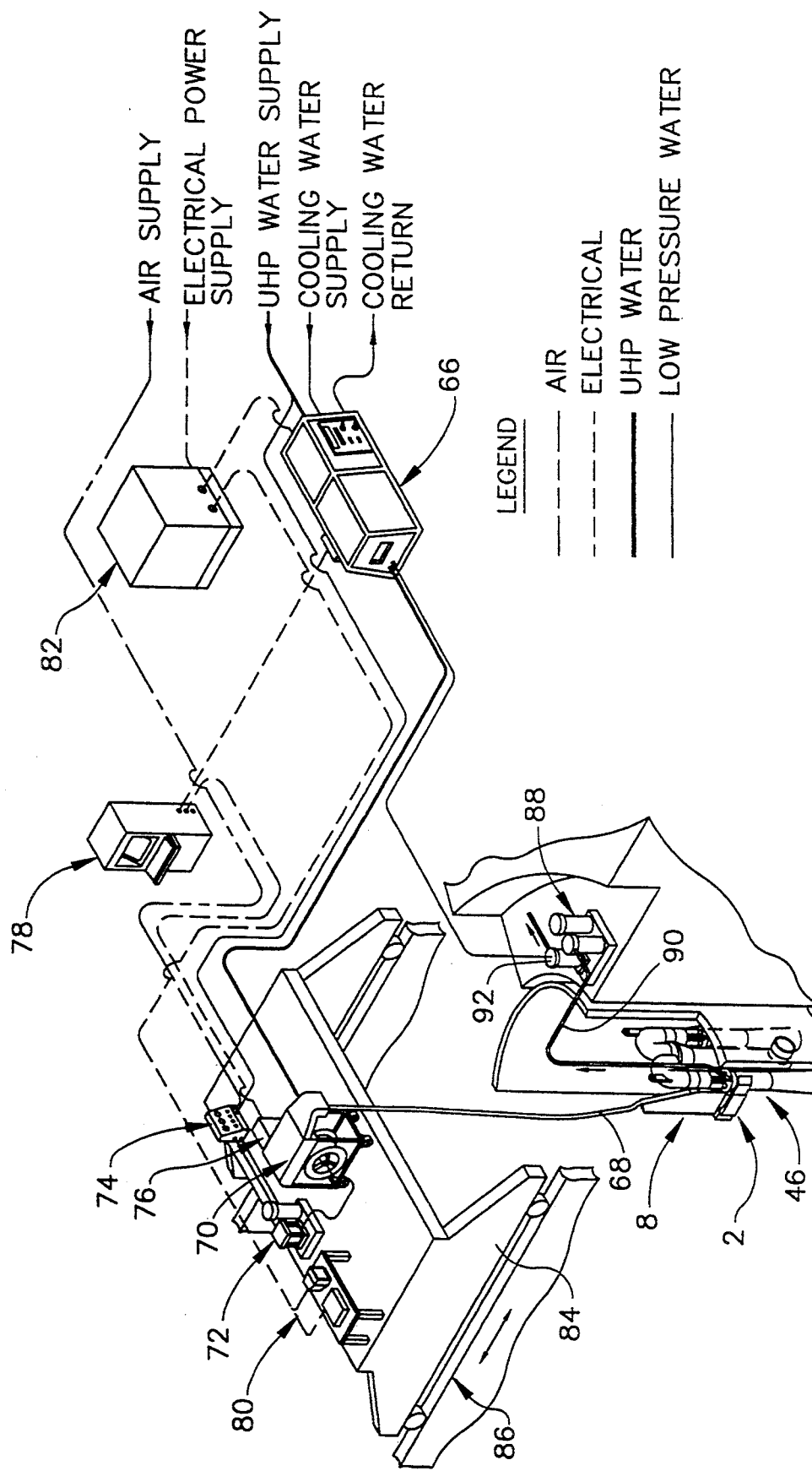
FIG. 3 is a schematic showing the support system for the cleaning apparatus of the invention.

In accordance with the apparatus of the invention, a nozzle cleaning tool/fixture assembly 6 or TBF cleaning tool/fixture assembly 8 is attached to an inlet mixer 46 by way of a clamping fixture 2 (see FIG. 3). UHP water is supplied to the cleaning tool by an UHP pump 66 via one of a plurality of umbilicals 68 unwound from a hose reel 70. Low pressure water (e.g., 600 psi) is supplied by a pneumatically operated intensifier pump 72, which is controlled by hydraulic control panel 74. Electrical power and sensing for the system motors is supplied by another umbilical connected to an electrical junction box 76 mounted on hose reel 70. Central computer control system 78 controls and monitors the position and orientation of the cleaning tool, and activates and deactivates the supply of UHP and low-pressure water to the cleaning tool and related fixtures. Electrical power is optionally supplied to UHP pump 66 and to the monitoring system 80 (including a TV monitor, a character generator and a video cassette recorder) by a transformer 82 if 460 V 60 Hz or 380 V 50 Hz is unavailable.

Hose reel 70, pump 72, hydraulic control panel 74 and monitoring equipment 80 are installed on the refueling platform 84, which is translatable along a pair of tracks 86. UHP pump 66, computer control system 78, transformer 82 and tracks 86 reside on the refueling floor.

During UHP cleaning, scale buildup debris dispersed in the water inside the inlet mixer is removed from the internal surfaces of the inlet mixer 46 and sucked out by filter/pump 88 via inlet suction line 90. The pump operates at low pressure (i.e., about 100 psi). The filter collects the debris. Discharge pump 92 pumps the filtered water back into the pool.

Figure 4:
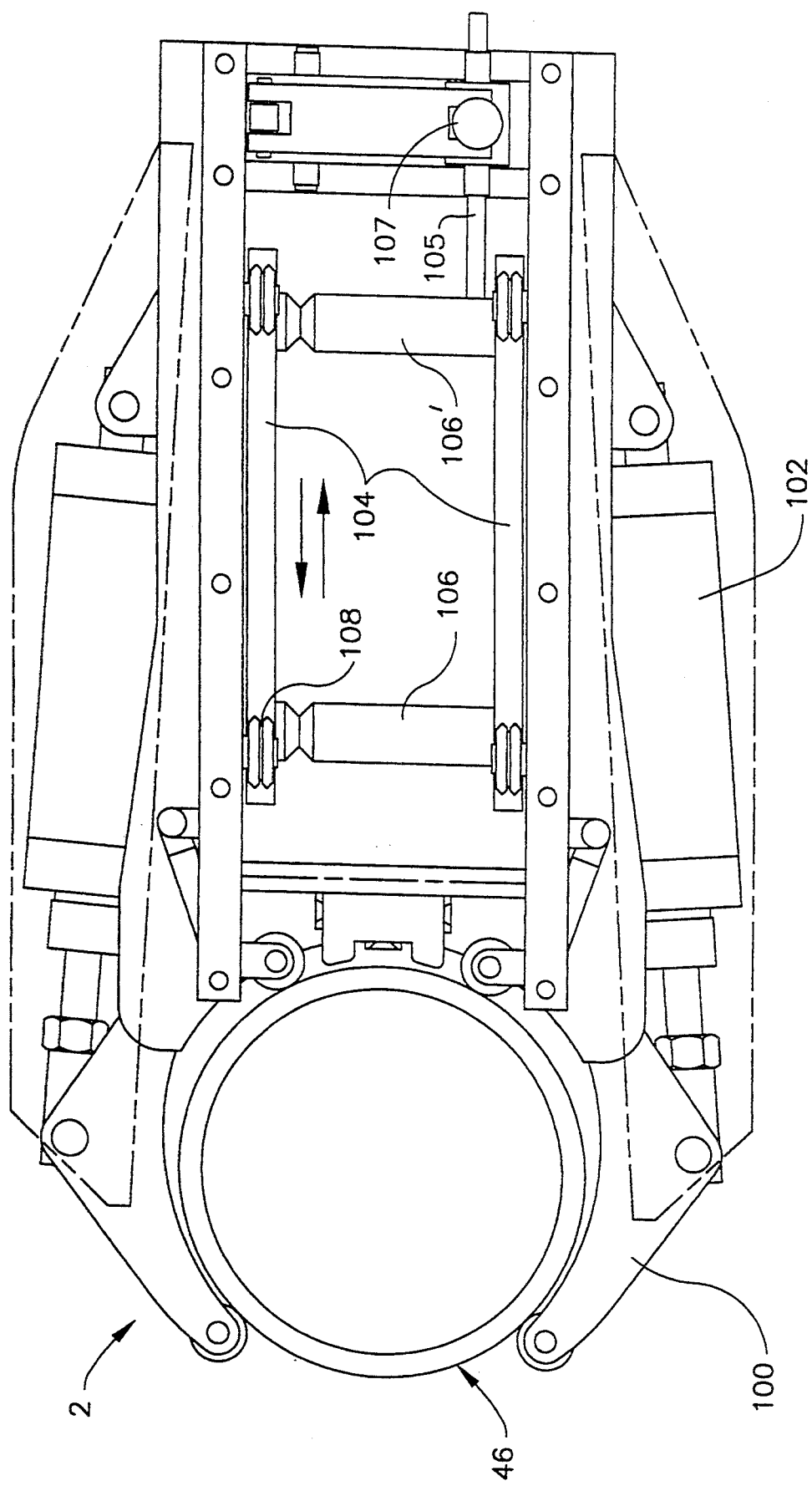
FIG. 4 is a top view of a clamp fixture in accordance with the invention.

Referring to FIG. 4, a clamping fixture 4 comprises a pair of clamp arms 100, each of which is driven by a pair of clamp cylinders 102 (only one cylinder of each pair is visible). Clamp arms 100 clamp onto the inlet mixer 46 in response to controlled low-pressure water received via an umbilical 101 (see FIG. 10). A base 104 with a pair of locating pins 106 and 106' slides on rollers 108 relative to the frame of the clamping fixture. Base 104 is locked in a desired position by actuation of a base lock cylinder 107 using low-pressure water received via an umbilical 111 (shown in FIG. 6). In the locked state, base lock cylinder secures a locking pin 105 extending from base 104.

Figure 5:
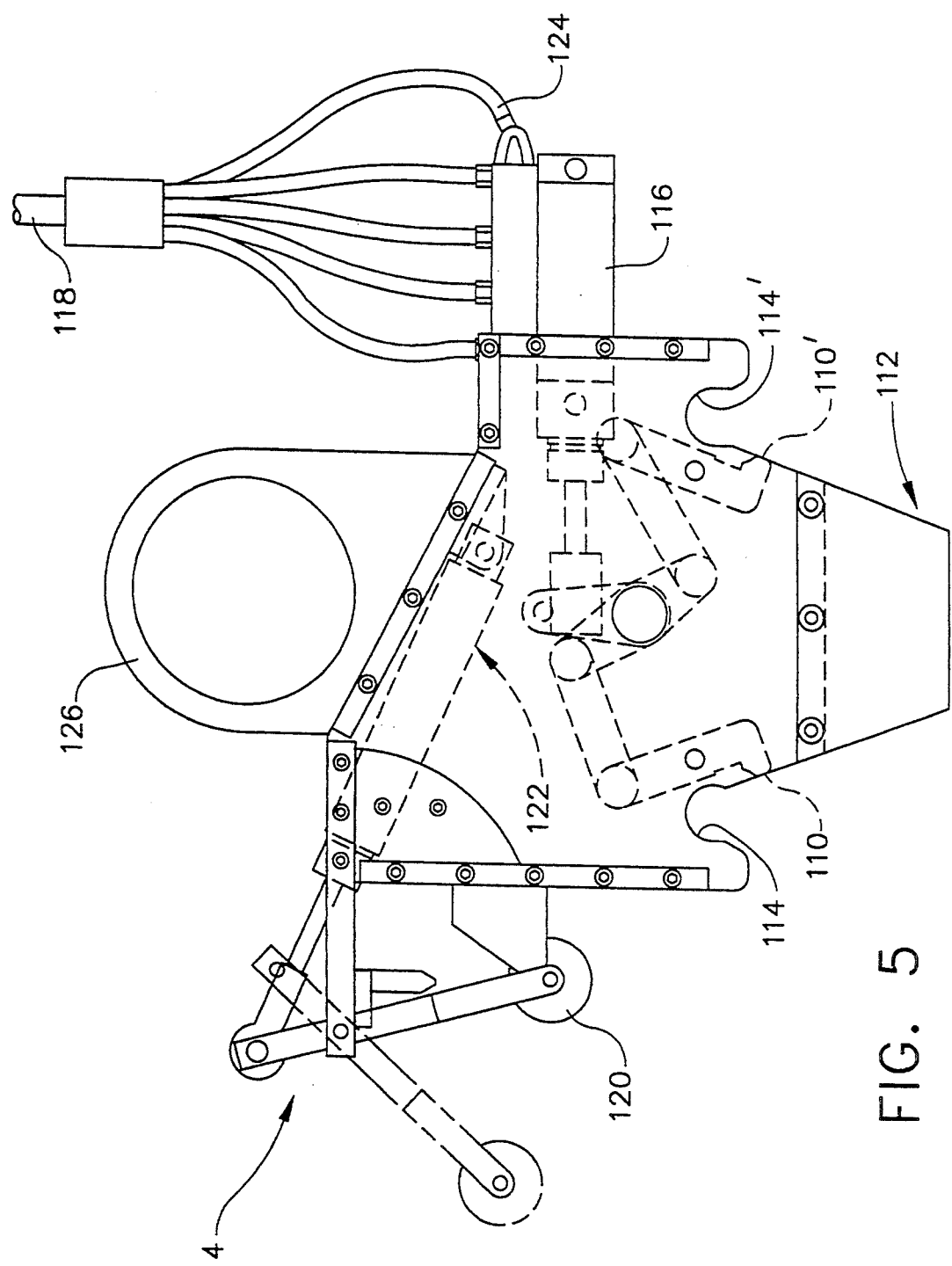
FIG. 5 is a side view of a locating fixture in accordance with the invention.

Before the clamping fixture can be clamped, it must precisely positioned relative to the inlet mixer, since in later operations the clamping fixtures provides the sole support for the nozzle and TBF cleaning fixtures which must guide the respective cleaning tools through a secondary inlet opening 62. Positioning of the clamping fixture relative to the inlet mixer and of the sliding base relative to the clamping fixture is accomplished by a locating fixture 4 (see FIG. 5).

Locating fixture 4 has a mount 112 which pilots into the clamping fixture between locating pins 106 and 106'. A safety cable 124 connects umbilical 118 to locating fixture 4. A pair of recesses 114 and 114' on locating fixture 4 receive the locating pins 106 and 106' respectively (see FIG. 4). The locating fixture is latched into this position by means of latches 110 and 110' which are mechanically linked to a latching cylinder 116. In response to low-pressure water received via umbilical 118, the latches 110 and 110' lock the locating fixture to the sliding base 104 (see FIG. 4) for sliding relative to clamping fixture 2. The nozzle cleaning and TBF cleaning fixtures (described in detail below) have the same latching mechanisms for interchangeable mounting on the clamping fixture.

Figure 1:
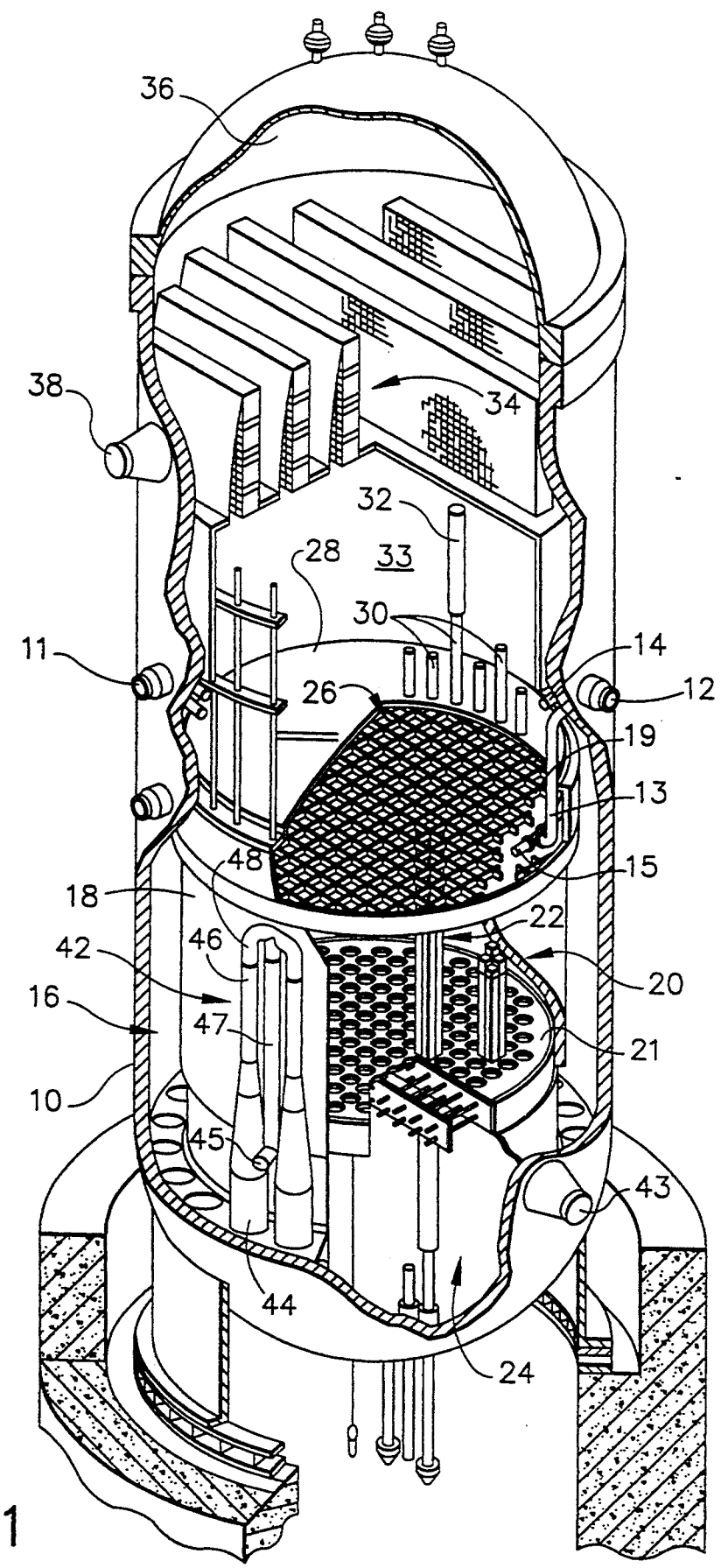
FIG. 1 is a schematic showing a partially cutaway perspective view of a conventional BWR.
Figure 2A:
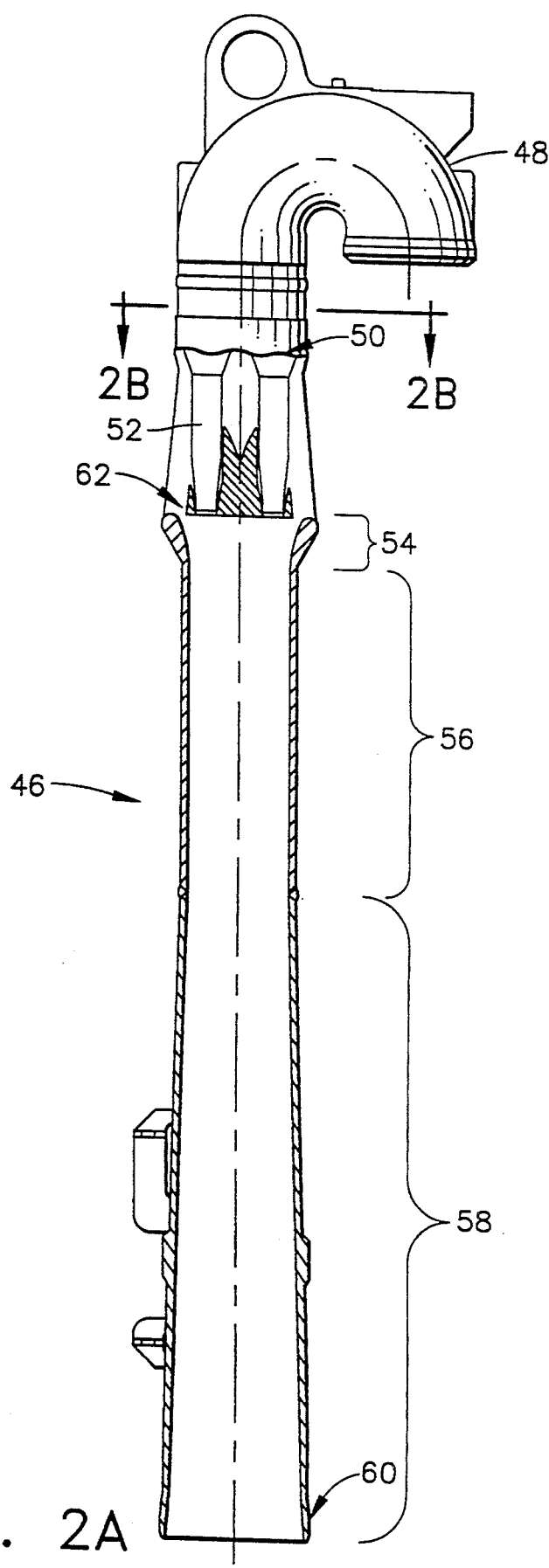
FIG. 2A is a partial sectional view of a conventional inlet mixer.
Figure 6:
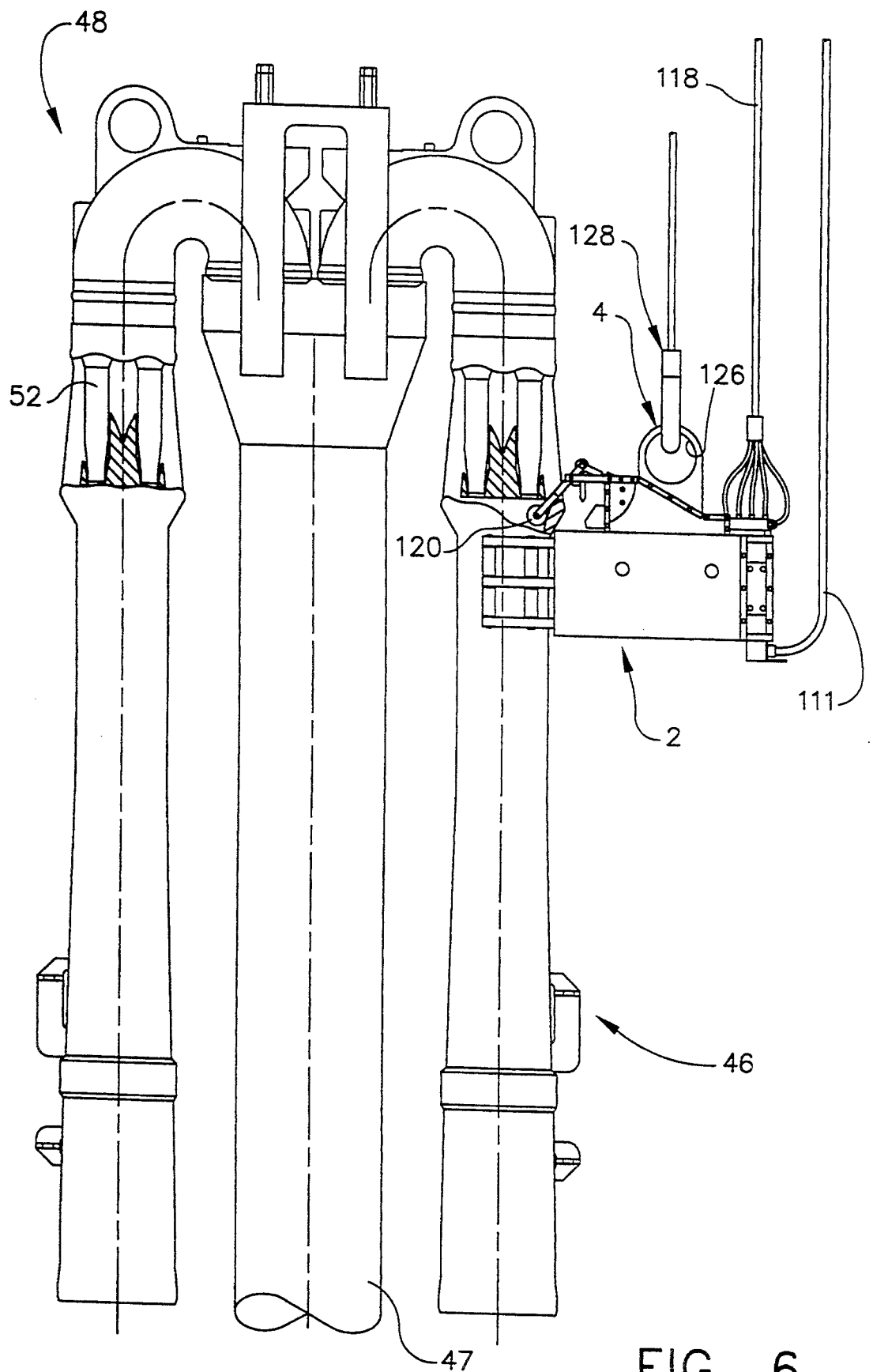
FIG. 6 shows the locating fixture of FIG. 5 mounted on the clamping fixture of FIG. 4, which is clamped on the inlet mixer of FIG. 2.

The locating fixture 4 provides the azimuthal and axial positioning of the clamping fixture 2 by means of a locating finger 120 manipulated by a finger cylinder 122 driven by low-pressure water. When finger cylinder 122 is retracted, the locating finger 120 is extended and vice versa. As best seen in FIG. 6, the clamping fixture is positioned so that locating finger 120 in its extended position extends into a secondary inlet aperture 62 of the inlet mixer 46. The locating finger 120 is then swung toward its retracted position, so that it bears against the inner surface of the throat section 54 (see FIG. 2A). As the locating finger continues to swing relative to the body of the locating fixture, the inner surface of the throat section blocks further movement, causing the locating finger to pull the clamping fixture 2 into contact with the inlet mixer. Clamp arms 100 are then clamped around the inlet mixer as shown in FIG. 4. Thereafter the locating finger continues to pull the sliding base 104 until a pair of locating stops (not shown) are contacted. Then sliding base 104 is locked in place. The locating fixture 4 is unlatched and lifted by a grapple hook 128 (see FIG. 6) which couples with a lifting eye 126 (see FIG. 5) on the locating fixture.

Figure 7:
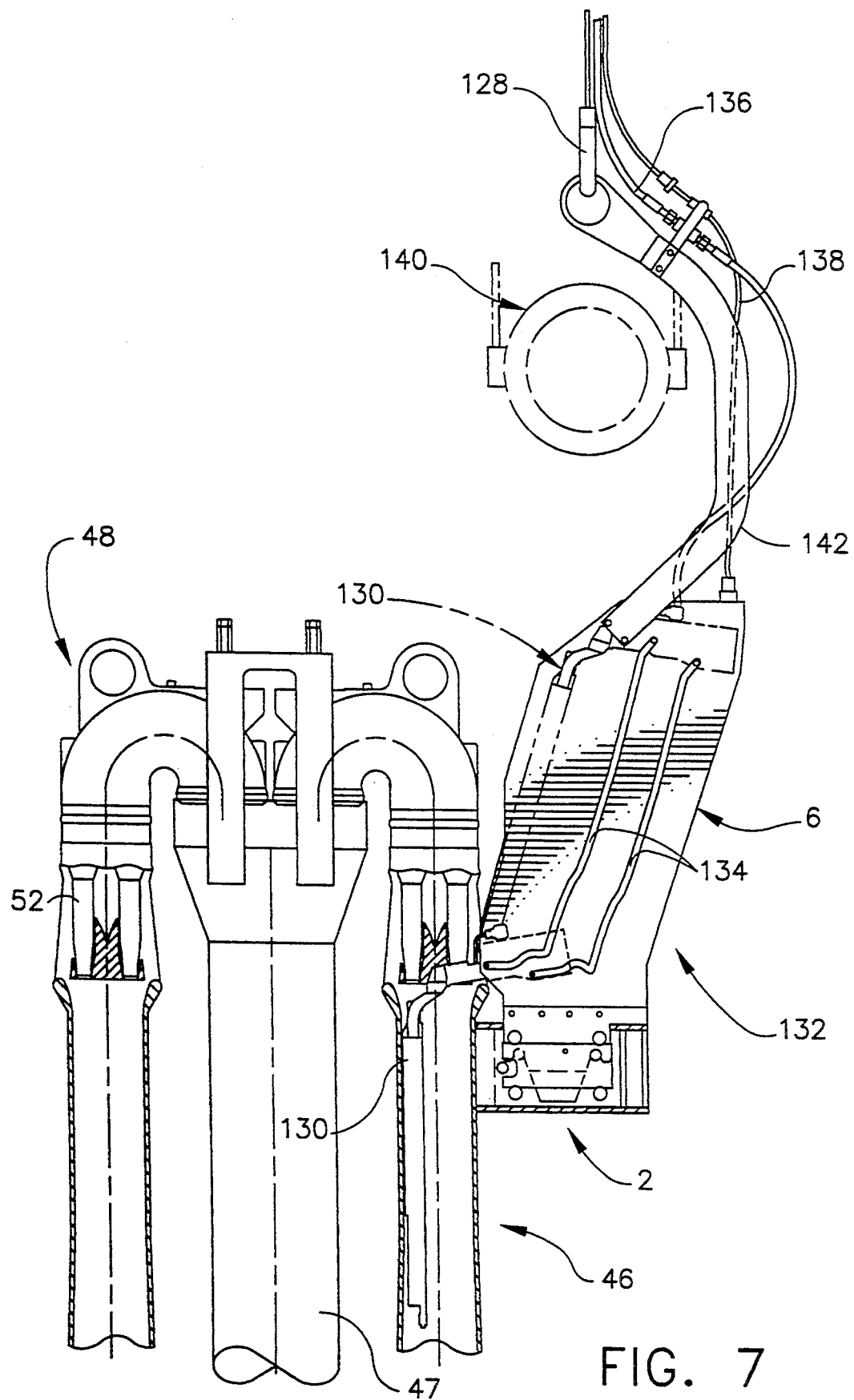
FIG. 7 shows a nozzle cleaning tool/fixture assembly in accordance with a preferred embodiment of the invention.

To clean the inlet mixer nozzles 52, a nozzle cleaning tool/fixture assembly 6 is lowered by grapple hook 128 into position on the clamping fixture, as shown in FIG. 7. Assembly 6 comprises a nozzle cleaning tool 130 and a nozzle cleaning fixture 132. Grapple hook 128 is hooked into a lifting eye of an low-pressure coolant inlet ("LPCI") adapter 142. Adapter 142 is a rigid boomerang-shaped member that bypasses the LPCI coupling 140 of a BWR, which is an obstacle to correct positioning of nozzle cleaning fixture 132.

Figure 2B:
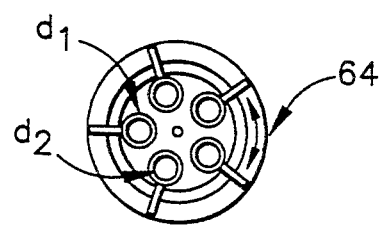
FIG. 2B is a sectional view of the inlet mixer of FIG. 2A taken along section line 2B—2B.

Fixture 132 has guide slots 134 which guide tool 130 from an uppermost position (shown by dashed lines) to a cleaning position inside the inlet mixer (shown by solid lines) in FIG. 7. The guide slots are shaped to provide the precise path of travel to enable the nozzle cleaning tool 130 to enter the inlet mixer via a secondary inlet opening (62 in FIG. 2B).

The nozzle cleaning tool 130 is used to clean the internal surfaces of the inlet mixer nozzles 52. Referring to FIGS. 8A and 8B, tool 130 has a cleaning head 144 which can travel along a circular orbit for the purpose of positioning the cleaning head under the nozzle 52 to be cleaned. Then the cleaning head 144 is raised in a direction parallel to the axis of that orbit to position the cleaning head inside the nozzle.

Figure 9A:
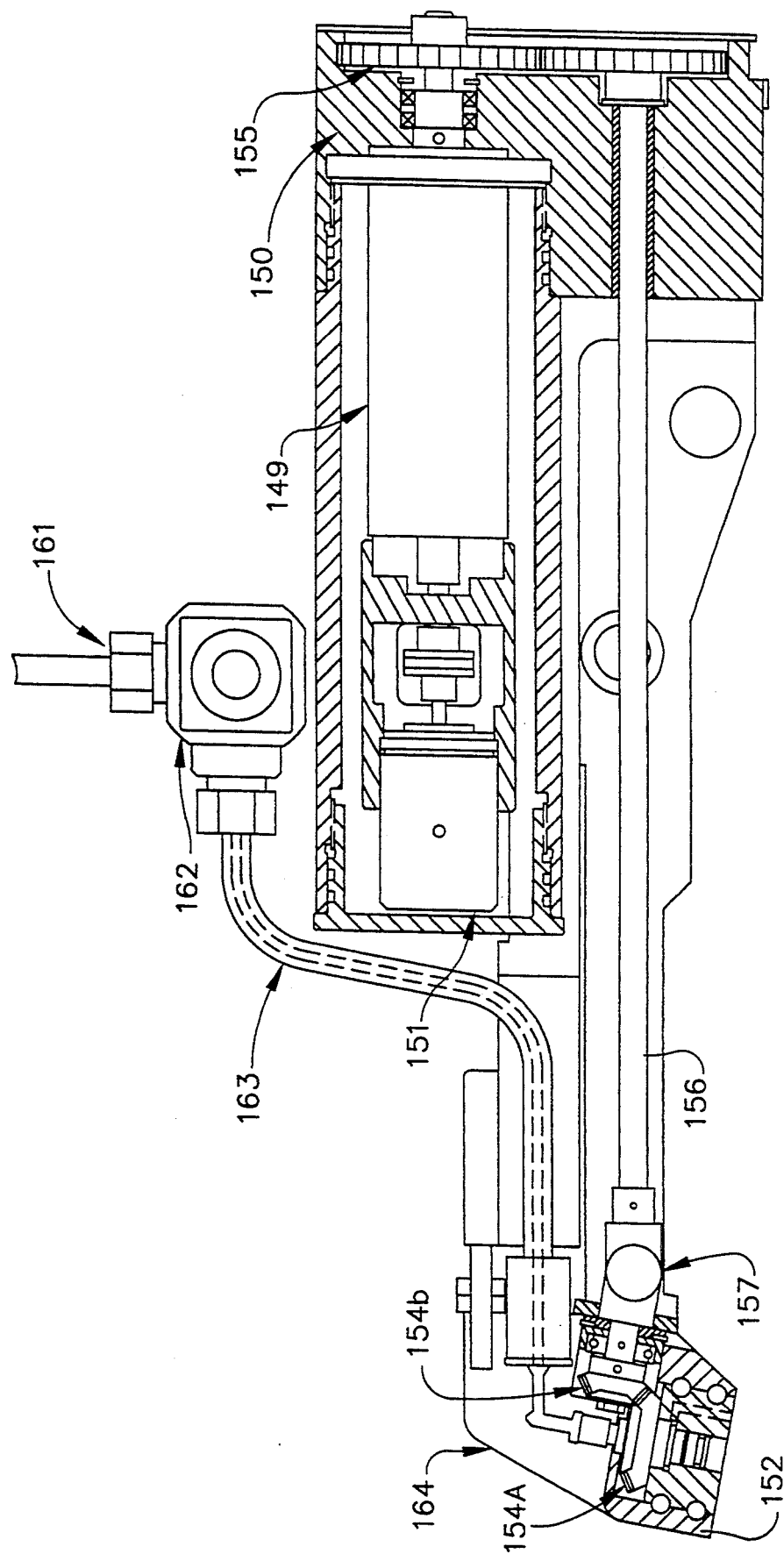
FIGS. 9A–9C are assembly drawings for three portions of the nozzle cleaning tool shown in FIG. 7.

Referring to FIG. 9A, the nozzle cleaning tool 130 has an indexing motor 149, located inside indexing drive 150, which drives rotation of a positioning arm 152 about an axis of bevel gear 154a by means of gears 155, drive shaft 156, universal joint 157 and bevel gear 154b. The indexing motor is electrically powered via umbilical 138 (see FIG. 7). A rotation sensor (resolver) 151 is mounted on the back of the indexing motor 149 to provide angular position feedback via umbilical 138.

Figure 9B:
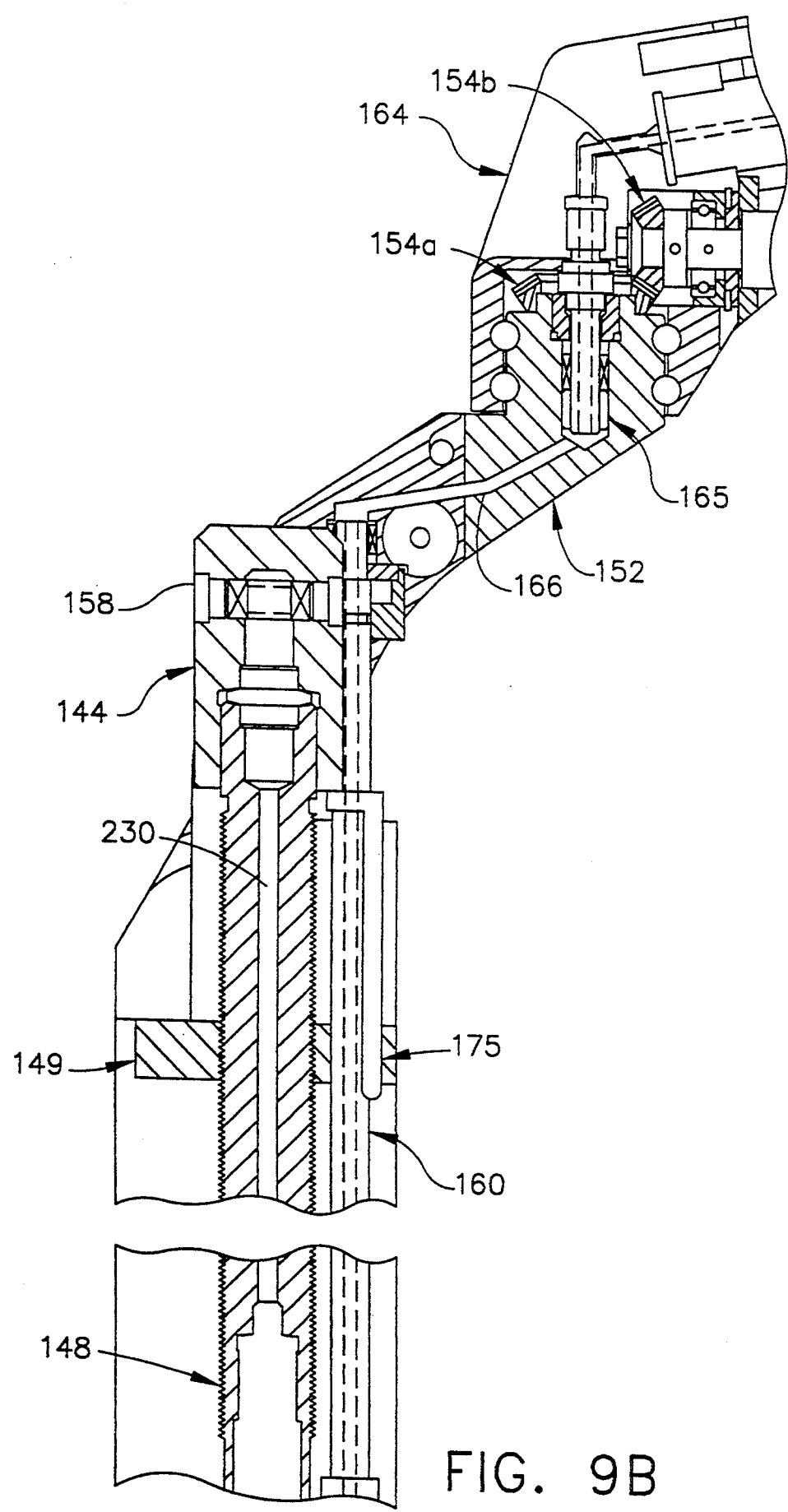

The UHP water is supplied via UHP hose 136 (see FIG. 7) to a UHP supply port 161 (see FIG. 8A). UHP water supply port 161 is connected to a swivel 162 (see FIG. 9A), which in turn supplies UHP water to one end of UHP tube 163. At its other end UHP tube 163 is connected to a swivel inside swivel housing 164. The UHP water then flows into UHP feed tube 160 (see FIG. 9B) via transfer tube 165 and channel 166.

Positioning arm 152 carries a stationary nut 149 which is threadably coupled to a lead screw 148 having a cleaning head 144 mounted on the top end thereof. The axis of lead screw 148 is parallel to the axis of rotation of bevel gear 154a. Positioning arm 152 has a length such that the distance between the axis of rotation of bevel gear 154a and the lead screw axis is equal to the pitch radius of the circular array of nozzles 52. Thus, rotation of positioning arm 152 enables cleaning head 144 to be oriented under any one of nozzles 52.

Figure 9C:
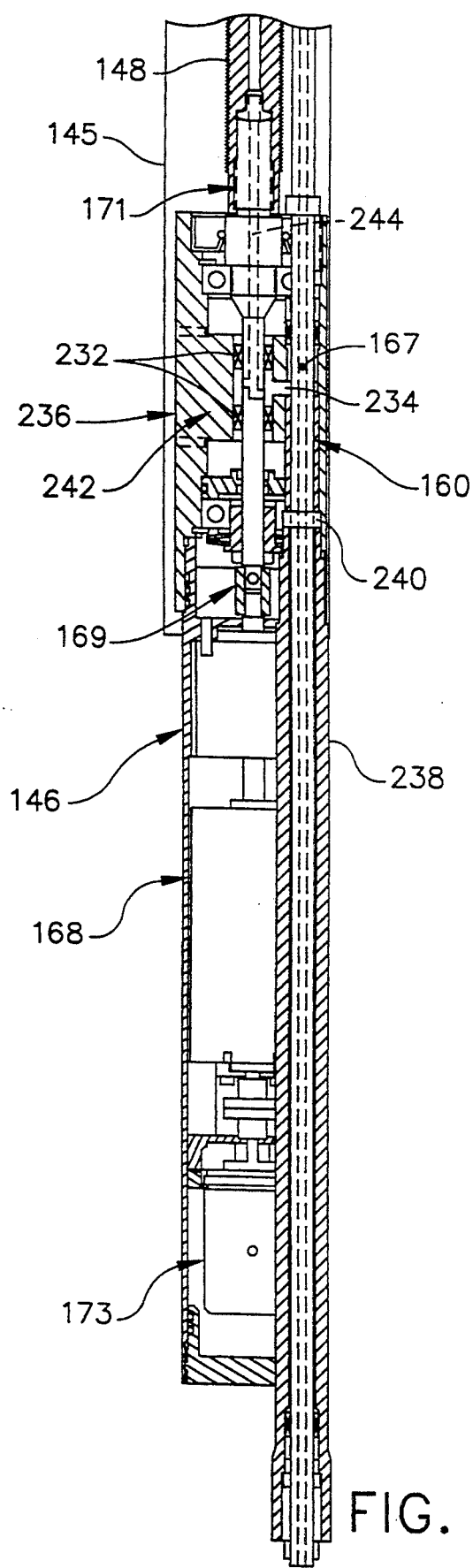

Referring to FIG. 9C, a second electrically powered motor 168, located inside a traveling housing 146 (see FIG. 8A), drives rotation of lead screw 148. A rotation sensor (resolver) 173 is mounted on the back of the lead screw drive motor 168 to provide cleaning head travel feedback via umbilical 138 (see FIG. 7). Rotation of lead screw 148 in either direction causes the cleaning head 144 to move up or down so that it can enter or exit an inlet mixer nozzle 52.

Cleaning head 144 has a nozzle 158 (see FIG. 9B) which directs the UHP waterjet 159 (see FIG. 8C). The UHP water is supplied to nozzle 158 by way of stationary feed tube 160, which has at least one cross hole 167. The UHP water exits cross hole 167 and enters the internal volume of body 236 either directly or via translating UHP tube 238. Translating tube 238, which surrounds stationary UHP feed tube 160 and forms an annular space therebetween, is coupled to (by a threaded port joint) and in fluid communication with body 236, so that UHP water flows from feed tube 160 to body 236 via translating tube 238 when body 167 has been elevated to a point beyond the elevation of cross hole 167. A sliding seal 240 prevents leakage between tubes 160 and 238.

A swivel joint 242 having two high-pressure seals 232 is in fluid communication with the internal volume of body 236 via a side port 234 and with the hollow shaft 230 (see FIG. 9B) of lead screw 148 via channel 244, completing the path of UHP water from feed tube 160 to nozzle 158. Swivel joint 242, UHP tube 238, body 236, motor 168 and resolver 173 are all located inside a traveling housing 146 which translates in unison with the lead screw.

As lead screw 148 rotates, a UHP waterjet 159 exits nozzle 158 on cleaning head 144 (see FIG. 8C). The waterjet 159 scans a spiral path on the internal surface of the inlet mixer nozzle 52.

To clean the throat (54), barrel (56) and flare (58) sections of the inlet mixer (see FIG. 2), a TBF cleaning tool/fixture assembly 8 is lowered by grapple hook 128 into position on the clamping fixture 2, as shown in FIG. 9. Assembly 8 comprises a TBF cleaning tool 170 and a TBF cleaning fixture 172. Fixture 172 hangs on the LPCI adapter 142 and is coupled to TBF fixture umbilical 192 which supplies low-pressure water for feeding the TBF cleaning tool 170 into the inlet mixer 46. Umbilical 192 is carried on grapple cable 129, which supports the LPCI adaptor 142.

An umbilical assembly 194 comprises a TBF rotation motor 196 (with associated resolver) and an umbilical 198 connected to the TBF cleaning tool 170. A lifting eye 204 for a grapple hook is provided to lift the umbilical assembly in the event that drive sprocket motor 192 fails. Umbilical 198 includes a hose 200 for supplying UHP water to the TBF cleaning tool, a hose 201 for supplying low-pressure water to the centralizing arms and a rotation drive cable 202 for rotating the TBF cleaning tool (see FIG. 12A). (The rotation sensor cable is not visible in FIG. 12A.) Rotation drive cable 202 is driven by TBF rotation motor 196 (see FIG. 10).

Figure 10:
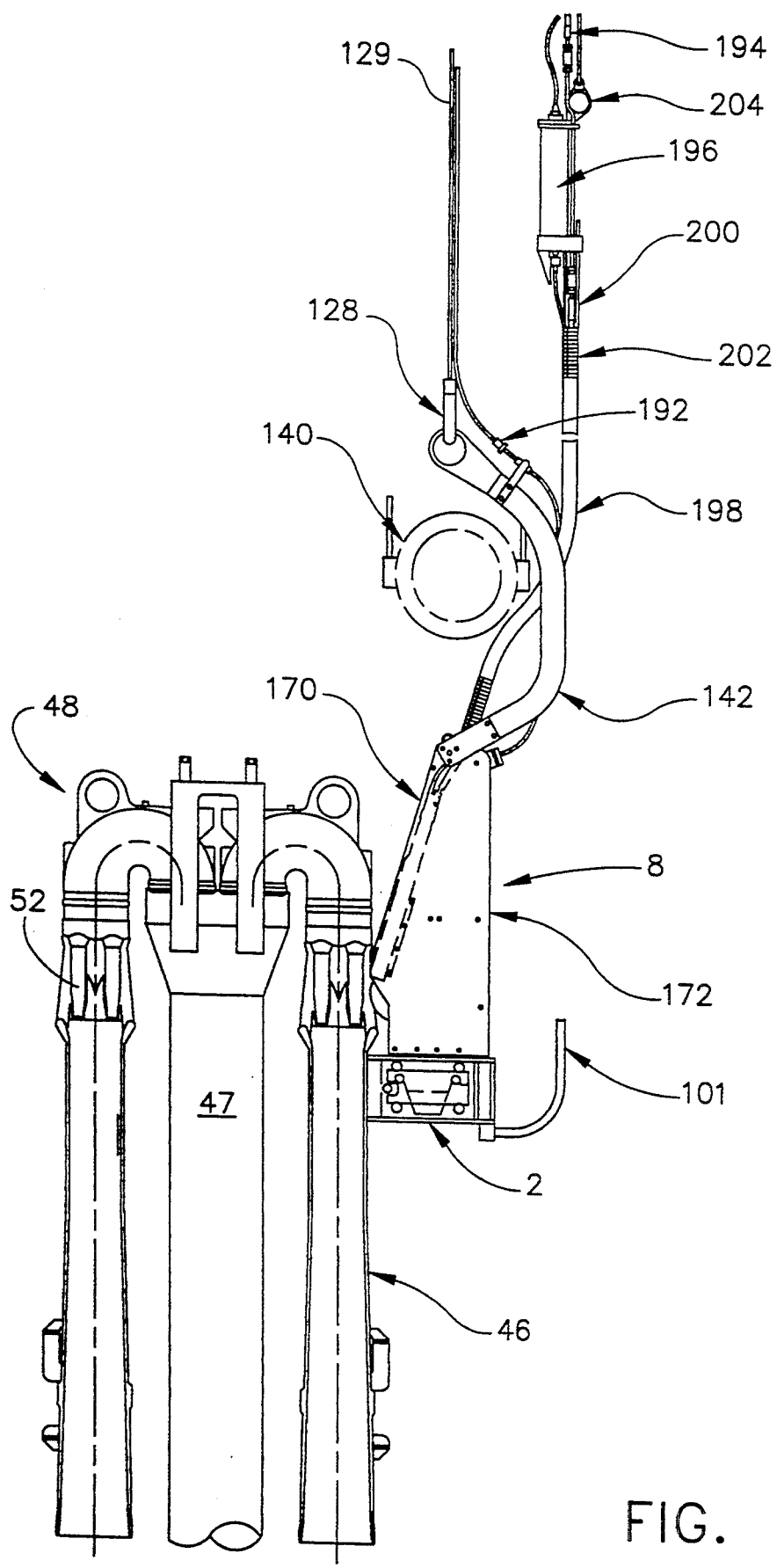
FIG. 10 shows a TBF cleaning tool/fixture assembly in accordance with another preferred embodiment of the invention before the tool is inserted into the inlet mixer.

The mechanism for feeding TBF cleaning tool 170 into the inlet mixer 146 is built into the TBF cleaning fixture 172 and comprises a TBF rotation motor 204 which drives a drive sprocket 206 by way of a gearbox 208 and a drive chain 210 (see FIG. 10). A rotation sensor (resolver) 205 coupled to motor 204 provides feedback to the central computer. TBF tool umbilical 198 is encased in a semi-flexible jacket 212 that is designed to provide support so the UHP conduit can be rotated and pushed up and down the TBF fixture during installation and cleaning. A support roller 214 is mounted on a pivotable member 216 which is biased to urge jacket 212 into contact with drive sprocket 206.

The jacket 212 has means for engaging the teeth on drive sprocket 206, whereby the jacket 212 and TBF cleaning tool 170 coupled thereto are displaced in response to rotation of drive sprocket 206. A pair of alignment slides 218 orient the TBF cleaning tool 170 at the proper angle for insertion into the inlet mixer. A guide roller 220 guides the TBF cleaning tool 170 into a secondary inlet opening 62.

Figure 11:
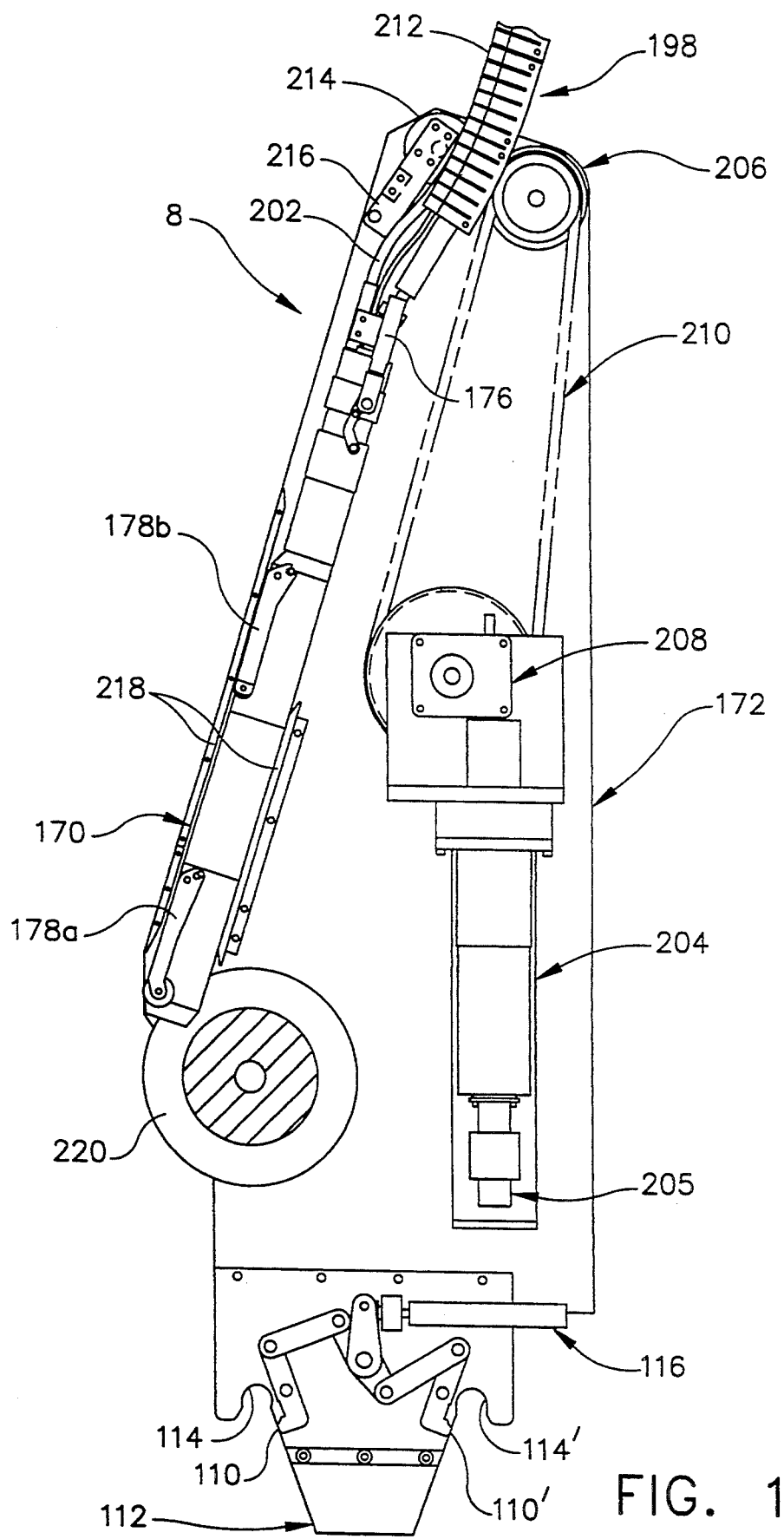
FIG. 11 is a magnified view of the TBF cleaning tool/fixture assembly shown in FIG. 10 with the side plate removed.

After insertion through a secondary inlet opening, TBF cleaning tool 170 is centered inside the inlet mixer by first and second pluralities of centralizing arms 178a and 178b, which respectively provide circumferentially distributed points of support at first and second elevations. In accordance with the preferred embodiment depicted in FIG. 11B, each plurality comprises three centralizing arms pivotably mounted to extend at equal angular intervals (i.e., 120 deg). Each centralizing arm has a roller at its terminus: rollers 224a for arms 178a and rollers 224b for arms 178b. The rollers 224a and 224b are arranged to roll axially over the internal surfaces of the inlet mixer as the TBF cleaning tool 170 is lowered in increments by the drive motor 204, thereby reducing friction between the cleaning tool and the inlet mixer.

Figure 13:
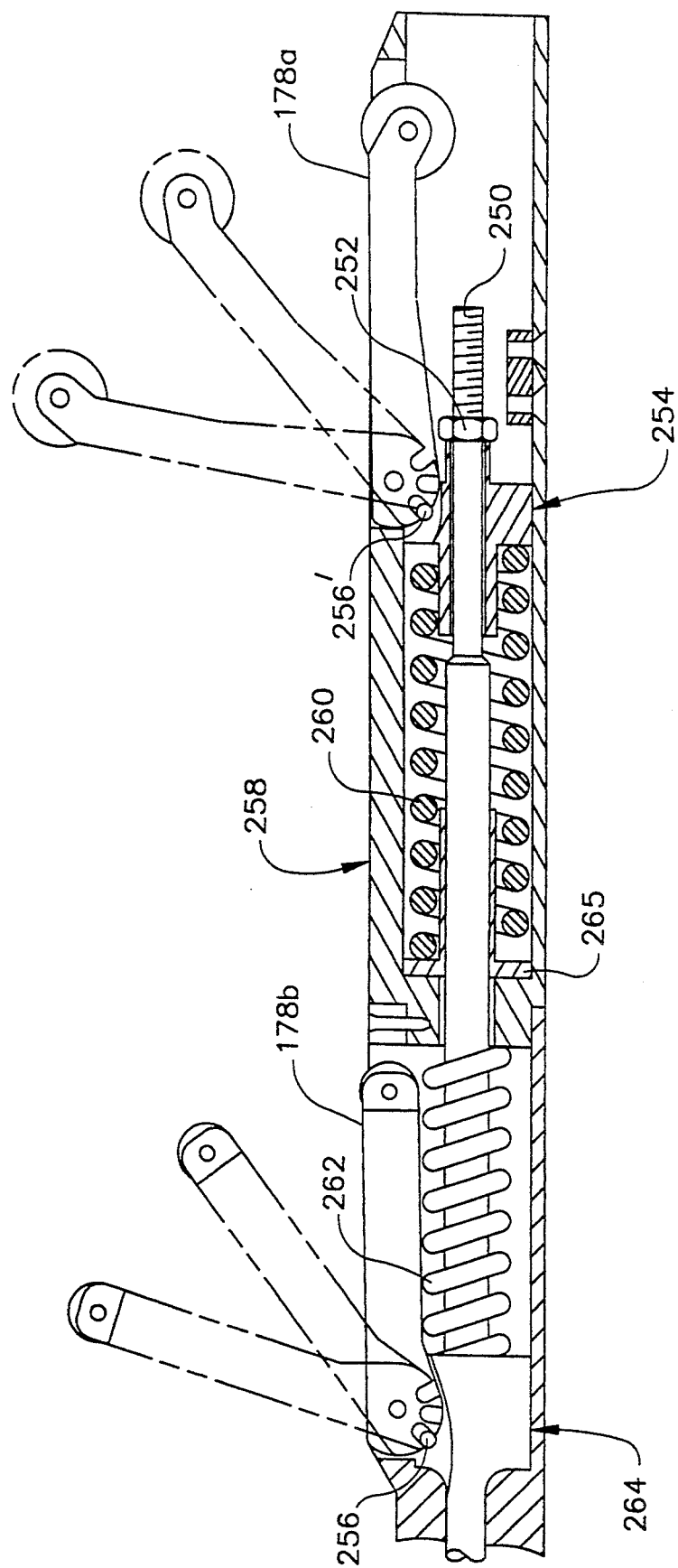
FIG. 13 is an assembly drawing for a portion of the TBF cleaning tool shown in FIG. 11.

Referring to FIG. 13, arms 178a and 178b are pivotably mounted on a stationary housing 258. Arms 178b are extended by a low-pressure water-driven piston 264, which carries pins 256 for coupling with respective recesses on arms 178b. Piston 264 is connected to a piston 265 which slides in housing 258, thereby compressing a spring 260. Spring 260 urges a piston 254, which slides on threaded shaft 250, to a position whereat pins 256' on piston 254 couple with respective recesses on arms 178a to extend the latter. Arms 178a and 178b pivot independently until further rotation is prevented by abutment with an internal surface of the inlet mixer. Upon venting of the low-pressure water, the piston 264 is pushed back to its starting position by spring 262, thereby retracting arms 178b. Likewise, threaded shaft 250, connected to piston 264, retreats and nut 252 overcomes the resistance of spring 260 to return piston 254 to its starting position, thereby also retracting arms 178a.

TBF cleaning tool 170 has one (or more) UHP waterjet nozzle 174 incorporated in the end of a rotor arm 176. The rotor arm 176 is pivotably mounted on a rotating swivel housing 222, which is rotated by rotation drive cable 202. A rotation sensor (resolver) 219 coupled to swivel housing 222 provides feedback to the central computer. Since the UHP waterjet in the TBF cleaning tool exits from an offset position relative to the swivel housing axis, the thrust of the jet acts to assist in rotation of the swivel housing. The jet thrust is sufficiently high that the TBF rotation drive cable 202 acts to slow down or maintain the desired rotation speed. At each incremental axial position of the waterjet nozzle 174, the swivel housing/rotor arm assembly is rotated 360°. By repeating this sequence of incremental axial advancement and 360° rotation, the internal surfaces of the throat, barrel and flare sections of the inlet mixer can be cleaned by the UHP waterjet exiting nozzle 174.

Rotor arm 176 is pivotable in an azimuthal plane relative to swivel housing 222. When the TBF cleaning nozzle 174 is being used to clean the flare section 58 (see FIG. 2) of the inlet mixer, it is desirable that the angle of inclination of rotor arm 176 be varied in dependence on the flare section radius to ensure that nozzle 174 will be maintained in proximity to the internal surface to be cleaned. This is accomplished by mechanically linking centralizing arms 178b to rotor arm 176, as described below.

Figure 12A:
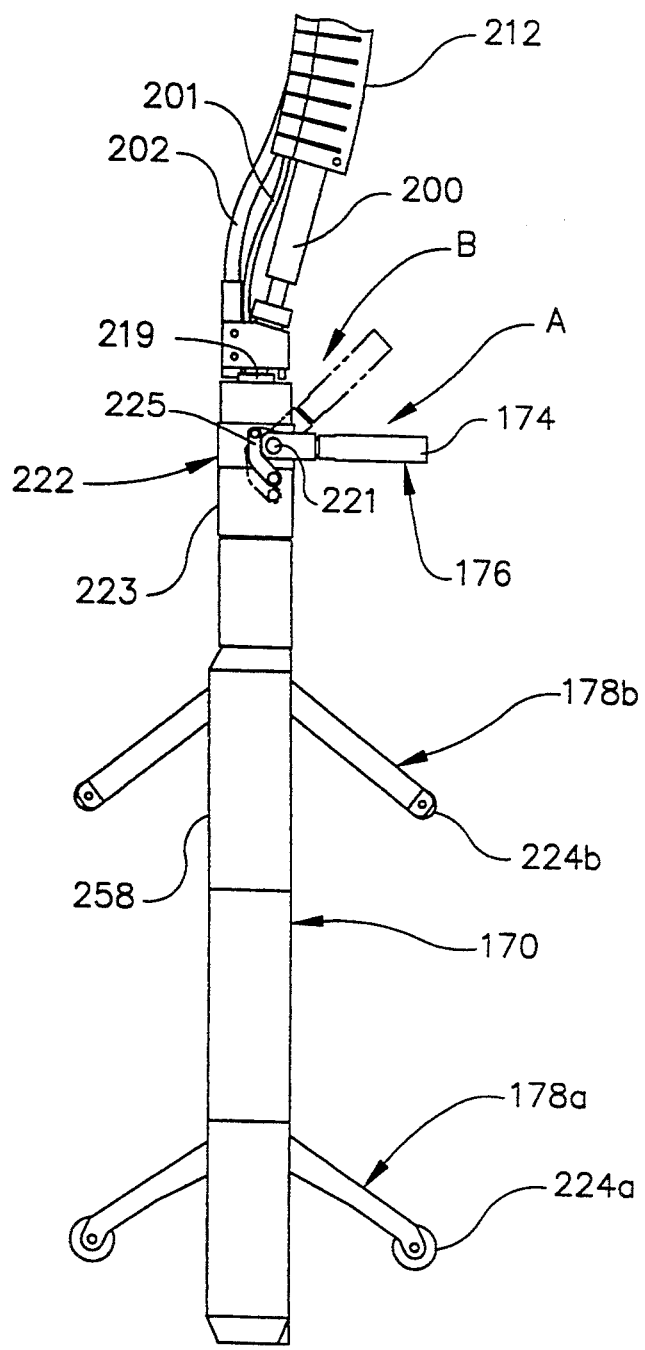
FIGS. 12A and 12B are side and top views of the TBF cleaning tool (with centralizing arms extended) shown in FIG. 11.
Figure 12B:
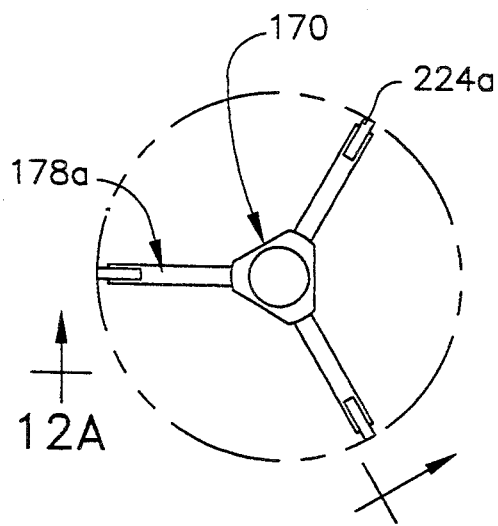

Referring to FIG. 12A, the TBF cleaning tool comprises a rotating sleeve 223 which is mounted on the piston housing 258 via bearings (not shown). Swivel housing 222 and rotating sleeve 223 rotate in unison, whereas swivel housing 222 is displaceable relative to rotating sleeve 223. Swivel housing 222 is coupled to piston 264 (see FIG. 13) so that the swivel housing displaces toward rotating sleeve 223 as the piston is driven to extend the centralizing arms.

Rotor arm 176 is pivotable about a pivot 221 mounted on swivel housing 222. The end of rotor arm 176 remote from nozzle 174 is coupled to rotating sleeve 223 by a mechanical linkage 225. Thus, as swivel housing 222 displaces in unison with piston 264, the rotating sleeve maintains one end of mechanical linkage 225 stationary. Thus, the other end of mechanical linkage 225 is displaced relative to pivot 221, causing rotor arm 176 to pivot as a function of piston displacement, e.g., from angular position B to angular position A.

The rotor arm 176 and centralizing arms 178a and 178b are disposed in retracted positions (as shown by dashed lines in FIG. 10) to facilitate insertion of the TBF cleaning tool into the inlet mixer.

The preferred embodiments have been described in detail for the purpose of illustration only. Variations and modifications of the disclosed embodiments will be apparent to any skilled mechanical engineer. For example, it will be apparent that the number of centralizing arms in each plurality can be more than three. Also the TBF cleaning tool could be provided with more than one rotor arm. Further, motors driven electrically can be replaced by motors driven by low-pressure water. All such variations and modifications are intended to be encompassed by the claims appended hereto.

We claim:

1. A system for removing scale from an internal surface of a tubular component submerged in liquid, comprising:

means for directing a jet of liquid toward said internal surface;

means for supplying liquid to said directing means, said liquid having a pressure equal to at least 20,000 psi;

means for scanning said liquid jet over said internal surface by rotating said directing means; and means for supporting said scanning means, wherein said directing means, said ultra-high-pressure liquid supplying means, said supporting means and said scanning means form parts of a remotely controllable tool, said supporting means comprises first and second pluralities of centralizing arms, said scanning means comprises a rotatable swivel housing driven by a first drive motor and an arm mounted on said rotatable swivel housing, said ultra-high-pressure supplying means comprises a hollow shaft formed in said arm, and said directing means comprises a jet nozzle in fluid communication with said hollow shaft in said arm, said liquid jet impinging on said internal surface along a circular orbit during rotation said swivel housing.

2. The system as defined in claim 1, further comprising first sensing means for providing an electrical feedback signal representing the amount of swivel housing rotation, said first sensing means being coupled to said first drive motor.

3. The system as defined in claim 1, further comprising a translatable member which translates in response to low-pressure water received via a low-pressure water line, said first plurality of centralizing arms being pivotable in an azimuthal plane relative to said supporting means and said arm being pivotable about a pivot mounted on said swivel housing in response to translation of said translatable member.

4. The system as defined in claim 2, further comprising means for changing the elevation of said tool inside said tubular component, said elevation changing means being driven by a second drive motor, further comprising second sensing means for providing an electrical feedback signal representing the change in tool elevation, said second sensing means being coupled to said second drive motor.

5. A system for removing scale from an internal surface of a nozzle of an inlet mixer installed in a nuclear reactor, comprising:
   means for directing at least one jet of water toward said internal surface;
   means for supplying water to said directing means, said water having a pressure equal to at least 20,000 psi;
   means for scanning said water jet over said internal surface by rotating said directing means; and
   means for supporting said scanning means in a position inside said inlet mixer and below said nozzle prior to cleaning,
   wherein said directing means, said ultra-high-pressure water supplying means, said supporting means and said scanning means form parts of a remotely controllable nozzle cleaning tool.

6. The system as defined in claim 5, wherein said supporting means comprises a stationary threaded nut, said scanning means comprises a lead screw threadably coupled to said nut and a drive motor for rotating said lead screw, said ultra-high-pressure water supplying means comprises a hollow shaft formed in said lead screw, and said directing means comprises a jet nozzle in fluid communication with said hollow shaft in said lead screw, a water jet exiting said jet nozzle and impinging on said internal surface along a spiral path during rotation of said lead screw.

7. The system as defined in claim 6, further comprising sensing means for providing an electrical feedback signal representing the amount of lead screw rotation, said sensing means being coupled to said drive motor.

8. The system as defined in claim 5, further comprising means for inserting said nozzle cleaning tool into said inlet mixer via a secondary inlet opening, said inserting means comprising a guide fixture having slot means for guiding said nozzle cleaning tool along an insertion path and a drive means for driving said nozzle cleaning tool to travel along said slot means.

9. The system as defined in claim 6, further comprising stationary feed tube means for carrying ultra-high-pressure water and translatable means in fluid communication with said stationary feed tube means during translation and with said hollow shaft of said lead screw, said translatable feed tube means being translatable in unison with translation of said lead screw, said ultra-high-pressure water being supplied to said jet nozzle via said stationary feed tube means, said translatable means and said hollow shaft of said lead screw in flow sequence.

10. A system for removing scale from an internal surface of a throat or barrel or flare section of an inlet mixer installed in a nuclear reactor, comprising:
    means for directing a jet of water toward said internal surface;
    means for supplying water to said directing means, said water having a pressure equal to at least 20,000 psi;
    means for rotating said directing means about an axis of rotation; and
    means for supporting said rotating means so that said axis of rotation is substantially parallel to an axis of said inlet mixer,
    wherein said directing means, said ultra-high-pressure water supplying means, said supporting means and said rotating means form parts of a remotely controllable throat/barrel/flare cleaning tool.

11. The system as defined in claim 10, wherein said supporting means comprises first and second pluralities of centralizing arms, said scanning means comprises a rotatable swivel housing driven by a first drive motor and an arm mounted on said rotatable swivel housing, said ultra-high-pressure supplying means comprises a hollow shaft formed in said arm, and said directing means comprises a jet nozzle in fluid communication with said hollow shaft in said arm, said water jet impinging on said internal surface along a circular orbit during rotation of said swivel housing.

12. The system as defined in claim 11, further comprising first sensing means for providing an electrical feedback signal representing the amount of swivel housing rotation, said first sensing means being coupled to said first drive motor.

13. The system as defined in claim 11, further comprising a translatable member which translates in response to low-pressure water received via a low-pressure water line, said first plurality of centralizing arms being pivotable in an azimuthal plane relative to said supporting means and said arm being pivotable about a pivot mounted on said swivel housing in response to translation of said translatable member.

14. The system as defined in claim 12, further comprising means for changing the elevation of said tool inside said tubular component, said elevation changing means being driven by a second drive motor, further comprising second sensing means for providing an electrical feedback signal representing the change in tool elevation, said second sensing means being coupled to said second drive motor.

* * * * *